US009208606B2

(12) United States Patent
Cook

(10) Patent No.: US 9,208,606 B2
(45) Date of Patent: Dec. 8, 2015

(54) SYSTEM, METHOD, AND COMPUTER PROGRAM PRODUCT FOR EXTRUDING A MODEL THROUGH A TWO-DIMENSIONAL SCENE

(75) Inventor: David R. Cook, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 214 days.

(21) Appl. No.: 13/592,250

(22) Filed: Aug. 22, 2012

(65) Prior Publication Data

US 2014/0055445 A1 Feb. 27, 2014

(51) Int. Cl.
G09G 5/00 (2006.01)
G06T 17/00 (2006.01)
G06T 15/04 (2011.01)

(52) U.S. Cl.
CPC .............. *G06T 17/00* (2013.01); *G06T 15/04* (2013.01)

(58) Field of Classification Search
CPC combination set(s) only.
See application file for complete search history.

(56) References Cited

U.S. PATENT DOCUMENTS

| 6,842,175 | B1* | 1/2005 | Schmalstieg et al. ......... 345/427 |
| 7,199,793 | B2 | 4/2007 | Oh et al. |
| 2005/0063582 | A1* | 3/2005 | Park et al. ..................... 382/154 |
| 2008/0007559 | A1* | 1/2008 | Kalaiah et al. ................ 345/501 |
| 2008/0057478 | A1* | 3/2008 | Choi ............................. 433/215 |
| 2008/0111814 | A1* | 5/2008 | Sengamedu et al. .......... 345/419 |
| 2009/0021513 | A1* | 1/2009 | Joshi et al. .................... 345/419 |
| 2011/0164029 | A1 | 7/2011 | King et al. |

OTHER PUBLICATIONS

Johnson et al., Using Spin Images for Efficient Object Recognition in Cluttered 3D Scenes, May 1999, IEEE Transactions on Pattern Analysis and Machine Intelligence, vol. 21, No. 5, 433-449.*
Igarashi et al., Teddy: A Sketching Interface for 3D Freeform Design, ACM, Dec. 1999, 409-416.*
Cascia, Marco La, and Stan Sclaroff. Proceedings: 1999 IEEE Computer Society Conference on Computer Vision and Pattern Recognition: Jun. 23-25, 1999: Fort Collins, Colorado. Los Alamitos, CA: IEEE Computer Society, Dec. 1999. Print.*
Bill, J. R., "Computer Sculpting of Polygonal Models using Virtual Tools," Thesis, Jun. 1994, pp. 1-73.
Pasko, G. et al., "Ascending in Space Dimensions: Digital Crafting of M.C. Escher's Graphic Art," Leonardo, vol. 44, No. 5, 2011, pp. 4111-4416.
Examination Report from German Patent Application No. 10 2013 215 301.5, dated Sep. 18, 2014.
Office Action from Taiwan Patent Application No. 102128510, dated Dec. 17, 2014.

* cited by examiner

*Primary Examiner* — Stephen R Koziol
*Assistant Examiner* — Robert Craddock
(74) *Attorney, Agent, or Firm* — Zilka-Kotab, PC

(57) ABSTRACT

A system, method, and computer program product are provided for extruding an object through a two-dimensional scene. In use, a two-dimensional object is identified within a two-dimensional scene. Additionally, a three-dimensional model is determined that corresponds to the two-dimensional object. Further, the three-dimensional model is extruded through the two-dimensional scene to create a three-dimensional object.

18 Claims, 4 Drawing Sheets

SYSTEM, METHOD, AND COMPUTER PROGRAM PRODUCT FOR EXTRUDING A MODEL THROUGH A TWO-DIMENSIONAL SCENE

FIELD OF THE INVENTION

The present invention relates to image processing, and more particularly to image alteration.

BACKGROUND

Two-dimensional graphical content has enjoyed great popularity in modern society. For example, two-dimensional graphical content may be included in media such as movies, video games, images, etc. However, current techniques for altering such two-dimensional graphical content have been associated with various limitations.

For example, current techniques for converting two-dimensional graphical content to three-dimensional content are complicated and time-consuming. Additionally, the results of such techniques are commonly crude and inaccurate. There is thus a need for addressing these and/or other issues associated with the prior art.

SUMMARY

A system, method, and computer program product are provided for extruding an object through a two-dimensional scene. In use, a two-dimensional object is identified within a two-dimensional scene. Additionally, a three-dimensional model is determined that corresponds to the two-dimensional object. Further, the three-dimensional model is extruded through the two-dimensional scene to create a three-dimensional object.

DETAILED DESCRIPTION

Figure 1:
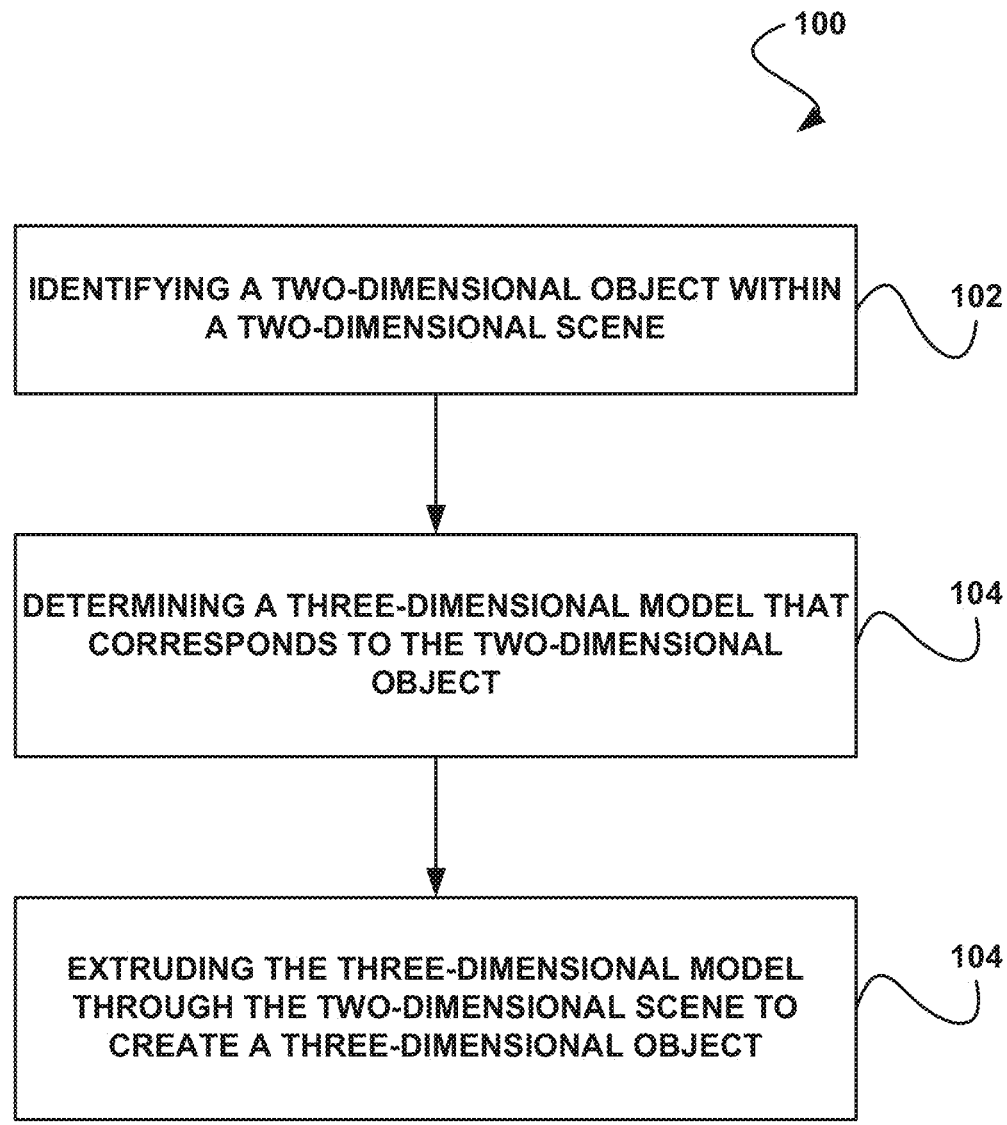
FIG. 1 shows a method for extruding an object from a two-dimensional scene, in accordance with one embodiment.

FIG. 1 shows a method 100 for extruding a model through a two-dimensional scene, in accordance with one embodiment. As shown in operation 102, a two-dimensional object is identified within a two-dimensional scene. In one embodiment, the two-dimensional scene may include an image. For example, the two-dimensional scene may include a digital image such as a scanned photograph, a screenshot of a video, a frame of a video, etc.

Additionally, in one embodiment, the two-dimensional object may include any object within the two-dimensional scene. For example, the two-dimensional object may include an image of an individual, an image of a physical object, etc. In another embodiment, a plurality of two-dimensional objects may be displayed within the two-dimensional scene.

Further, in one embodiment, the two-dimensional object may be manually identified within the two-dimensional scene. For example, a user may manually select the two-dimensional object utilizing a graphical user interface (GUI) through which the two-dimensional scene is displayed. In another embodiment, the two-dimensional object may be automatically identified. For example, one or more applications may analyze the two-dimensional scene and may automatically/dynamically detect the two-dimensional object within the two-dimensional scene (e.g., by utilizing shape recognition, image processing, etc.).

Further still, as shown in operation 104, a three-dimensional model is determined that corresponds to the two-dimensional object. In one embodiment, the three-dimensional model may include a wire frame model that may be displayed in association with the two-dimensional scene. In another embodiment, the three-dimensional model may include a transparent or translucent model that may be displayed in association with the two-dimensional scene. Of course, however, the three-dimensional model may include any model that is represented using three dimensions.

Also, in one embodiment, the three-dimensional model may be determined manually. For example, after manually identifying the two-dimensional object within the two-dimensional scene, the user may assign one or more identifiers to the two-dimensional object (e.g., by tagging the object with the identifiers, etc.). In another embodiment, the identifiers may indicate a type of the two-dimensional object, a category of the two-dimensional object, a full or partial description of the two-dimensional object, keywords associated with the two-dimensional object, etc.

In addition, in one embodiment, the one or more identifiers assigned to the two-dimensional object by the user may be used to determine the corresponding three-dimensional model. For example, a database may contain descriptors of a plurality of three-dimensional models, and the one or more identifiers assigned by the user to the two-dimensional object may be compared against the descriptors in the database. In another example, a three-dimensional model whose descriptor most closely matches the one or more identifiers assigned by the user to the two-dimensional object may be determined to correspond to the two-dimensional object.

Furthermore, in one embodiment, the three-dimensional model may be determined automatically. For example, after automatically identifying the two-dimensional object within the two-dimensional scene, the two-dimensional object may be automatically analyzed to determine a type of the two-dimensional object. In another example, one or more subobjects (e.g., features, etc.) of the two-dimensional object may be identified and analyzed to determine the type of the object. In another embodiment, the type of the object may be compared against a database of three-dimensional model types, and a match between a three-dimensional model type and the type of the object may be determined.

Further still, as shown in operation 106, the three-dimensional model is extruded through the two-dimensional scene to create a three-dimensional object. In one embodiment, extruding the three-dimensional model through the two-dimensional scene may include moving the three-dimensional model in a third dimension through the two-dimensional scene, such that the three-dimensional model is forced through the two-dimensional scene to produce a three-dimensional object. For example, the two-dimensional scene may be represented on a two-dimensional plane utilizing a two-dimensional X-Y axis, and the three-dimensional model may be placed behind the plane of the scene on a Z axis perpendicular to the plane (e.g., such that the plane of the scene is overlaid upon the three-dimensional model). In another example, the three-dimensional model may then be moved through the plane of the scene via the perpendicular Z axis (e.g., such that the three-dimensional model is pushed through the two-dimensional scene via the Z axis).

Also, in one embodiment, extruding the three-dimensional model through the two-dimensional scene may include adjusting (e.g., warping, etc.) the two-dimensional scene in response to the movement of the three-dimensional model in the third dimension through the two-dimensional scene. For example, as the three-dimensional model is moved through the plane of the scene along the axis perpendicular to the scene, the two-dimensional scene may be warped such that a portion of the two-dimensional scene (e.g., the two-dimensional object, etc.) may cover (e.g., wrap, etc.) the three-dimensional model that is being moved through the plane of the scene.

Additionally, in one embodiment, the two-dimensional representation of the two-dimensional object may be warped such that the two-dimensional object wraps around and is mapped onto the three-dimensional model as the three-dimensional model is moved through the scene. For example, the two-dimensional representation of the two-dimensional object may be used as a texture map to create the surface of the three-dimensional model that has passed through the plane of the scene on the axis perpendicular to the scene. In another example, the two-dimensional representation of the two-dimensional object may be adjusted to follow the three-dimensional contours of the three-dimensional model such that the resulting representation of the two-dimensional object is three-dimensional. In this way, the three-dimensional model may be textured with content from the two-dimensional object.

Further, in one embodiment, extruding the three-dimensional model through the two-dimensional scene may include aligning the two-dimensional object with the three-dimensional model. In another embodiment, the two-dimensional object may be aligned with the three-dimensional model manually. For example, a user may use a graphical user interface (GUI) to manipulate (e.g., move, resize, reshape, etc.) the three-dimensional model such that the position, size, and shape of the three-dimensional model is aligned with the position, size, and shape of the two-dimensional object along the axis perpendicular to the scene. In another example, the user may manipulate the three-dimensional model before or after the three-dimensional model has moved through the plane of the scene.

Further still, in one embodiment, the two-dimensional object may be aligned with the three-dimensional model automatically. For example, one or more sub-objects (e.g., features, etc.) of the two-dimensional object may be manually identified or automatically identified (e.g., utilizing image processing, etc.), and the orientation of such sub-objects within the two-dimensional object may be determined. In another example, an orientation of the two-dimensional object within the two-dimensional scene may be determined based on the orientation of the sub-objects within the two-dimensional object.

In yet another example, the determined orientation of the two-dimensional object within the two-dimensional scene may be used to automatically determine adjustments to the three-dimensional model such that the three-dimensional model is aligned with the two-dimensional object along the axis perpendicular to the scene. In another embodiment, one or more characteristics (e.g., shape, capabilities, movement limitations, available positions, function, etc.) may be associated with the three-dimensional model, and such characteristics may be used to refine the automatic alignment of the two-dimensional object with the three-dimensional model.

Also, in one embodiment, a degree to which the three-dimensional model is extruded through the two-dimensional scene may be adjusted. For example, the distance that the three-dimensional model passes through the two-dimensional plane of the two-dimensional scene on the axis perpendicular to the scene may be adjusted manually or automatically. In another embodiment, one or more additional adjustments to the three-dimensional model (e.g., alignment, size, etc.) may be made manually or automatically after the three-dimensional model has been moved through the two-dimensional scene (e.g., to fine-tune the coverage of the three-dimensional model by the two-dimensional object, etc.). In this way, three-dimensional models of known objects may be adapted to match size and characteristics of two-dimensional objects, and the two-dimensional objects may be extruded using their corresponding three-dimensional model data as a base of extrusion.

In addition, in one embodiment, extruding the three-dimensional model through the two-dimensional scene may include converting the two-dimensional object to a three-dimensional object, utilizing the three-dimensional model. For example, the extruded three-dimensional model may be converted into a three-dimensional object having the shape of the three-dimensional model and the appearance of the warped two-dimensional object. In another embodiment, extruding the three-dimensional model through the two-dimensional scene may include converting the two-dimensional object to a stereoscopic object. For example, the extruded two-dimensional object may be converted into a stereoscopic object having the shape of the three-dimensional model and the appearance of the warped two-dimensional object. In another example, the three-dimensional model may provide depth data that may allow for an accurate stereoscopic depth.

In yet another embodiment, the two-dimensional object may include one or more two-dimensional sub-objects. For example, a two-dimensional representation of a face may include sub-objects include eyes, a nose, a mouth, etc. In still another embodiment, the two-dimensional object may be subdivided, and three-dimensional models may be determined for each two-dimensional sub-object within the two-dimensional object. In yet another embodiment, each of the two-dimensional sub-objects may be extruded from the two-dimensional scene, utilizing the three-dimensional models.

Furthermore, in one embodiment, the three-dimensional object created by extruding the two-dimensional object from the two-dimensional scene may be used to perform image recognition. For example, the three-dimensional object may be used during an analysis of a scene to determine if any three-dimensional objects in the scene match the created three-dimensional object. In another embodiment, the three-dimensional object created by extruding the two-dimensional object from the two-dimensional scene may be animated. For example, the three-dimensional object may be manipulated such that one or more portions of the three-dimensional object (e.g., sub-objects mapped onto the three dimensional object) move.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
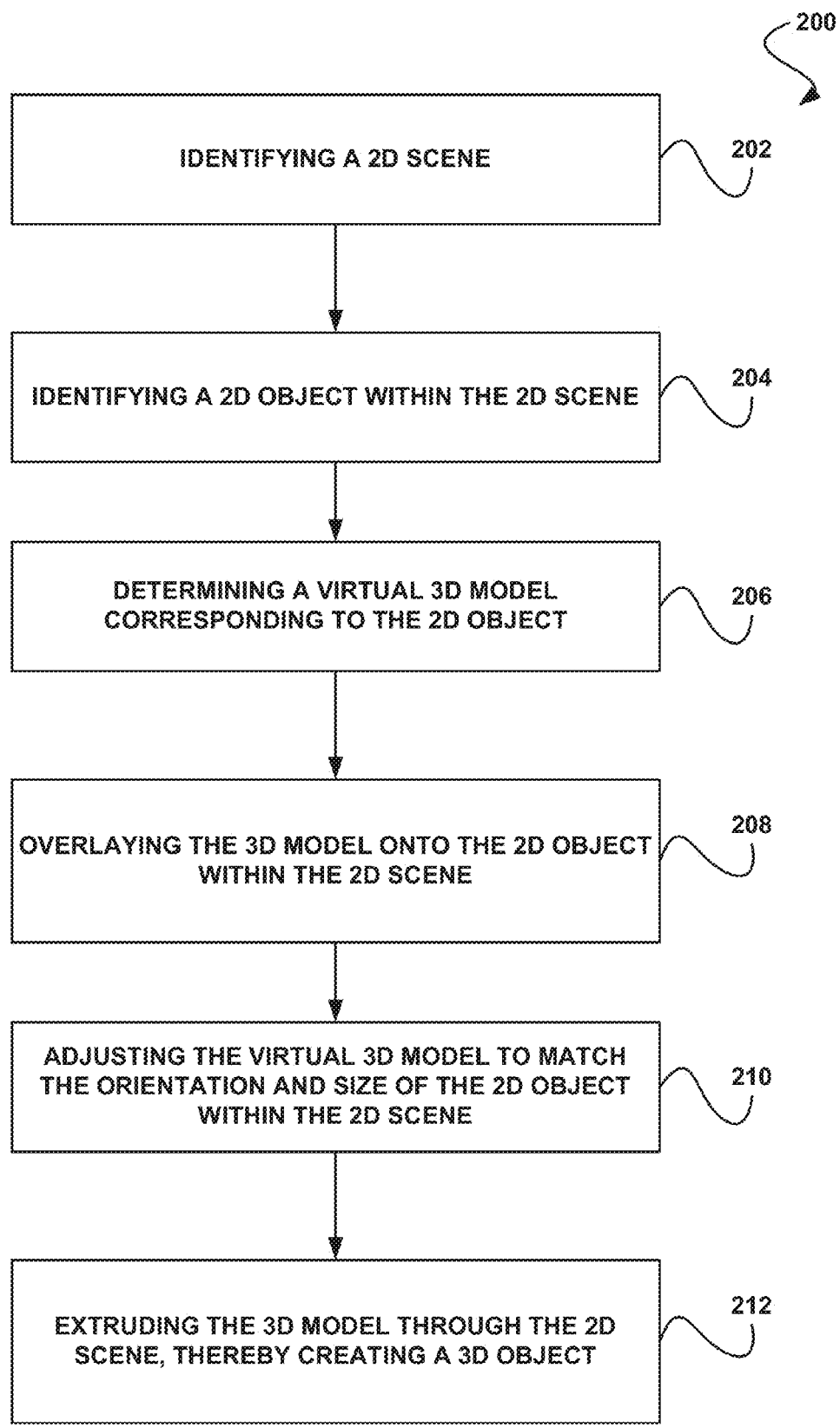
FIG. 2 shows a method for extruding a two-dimensional object into three-dimensional space, in accordance with another embodiment.

FIG. 2 shows a method 200 for extruding a two-dimensional object into three-dimensional space, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a two-dimensional (2D) scene is identified. In one embodiment, the two-dimensional scene may include a digital image. For example, a user may scan a still photograph, which may be converted into a two-dimensional digital image during scanning. In another embodiment, the two-dimensional scene may include a scene from a video. In yet another embodiment, a plurality of two-dimensional scenes may be identified. For example, a stereoscopic image including two two-dimensional images, each depicting a slightly altered version of the other, may be identified or multiple images take from different perspectives of the same object or objects.

Additionally, as shown in operation 204, a two-dimensional object is identified within the two-dimensional scene. In one embodiment, the two-dimensional object may include an individual shown in the two-dimensional scene (e.g., a human body, etc.), an object displayed within the two-dimensional scene (e.g., a house, a chair, etc.), etc. In another embodiment, the two-dimensional object may include a component object. For example, the two-dimensional object may include a face, a hand, or another part of an individual in the two-dimensional scene, a doorway of a house, etc. In still another embodiment, the two-dimensional object may include a combination of elements within the two-dimensional scene (e.g., a group of people, a bedroom with furniture, etc.).

Further, in one embodiment, the two-dimensional object may be identified by the user. For example, the user may select the two-dimensional object by selecting the object within the two-dimensional scene, utilizing a GUI. In another embodiment, after the two-dimensional object is identified, a shape of the two-dimensional object may be highlighted. For example, the specific perimeter outlining the selected two-dimensional object may be highlighted (e.g., bolded, changed to a different color, etc.) using image analysis.

Further still, as shown in operation 206, a virtual three-dimensional model corresponding to the two-dimensional object is determined. In one embodiment, the user may tag the two-dimensional object with one or more identifiers of the object, and the tag may be used to determine the three-dimensional model corresponding to the two-dimensional object. In another embodiment, image processing may be used to automatically identify the two-dimensional object and determine the corresponding three-dimensional model. In yet another embodiment, the virtual three-dimensional model may be selected from a plurality of models (e.g., predesigned models, etc.).

Also, as shown in operation 208, the virtual three-dimensional model is overlaid onto the two-dimensional object within the two-dimensional scene. As shown in operation 210, the virtual three-dimensional model is adjusted to match the orientation and size of the two-dimensional object within the two-dimensional scene. In one embodiment, the user may manually scale, tilt, and otherwise adjust the three-dimensional model such that the perimeter of the three-dimensional model lines up with the perimeter of the two-dimensional object within the two-dimensional scene.

In another embodiment, image processing may be used to automatically analyze the orientation and/or features of the two-dimensional object. Additionally, such analysis may be used to adjust the three-dimensional model. In another embodiment, a depth of the three-dimensional model may be adjusted automatically or by the user. For example, the three-dimensional model may be moved backward or forward in Z space to adjust a depth of the three-dimensional model with respect to the two-dimensional scene.

Further, as shown in operation 212, the three-dimensional model is extruded through the two-dimensional scene, thereby creating a three dimensional object. In one embodiment, the extrusion may be performed in response to a command from the user. In another embodiment, extruding the two-dimensional object from the scene may include wrapping the three-dimensional model with the pixels contained in the two-dimensional object and extruding the wrapped three-dimensional model.

Further still, in one embodiment, the user may view the three-dimensional model being used for the extruding and may adjust the model during the extruding by manually transforming the model to fit the shape and position of the two-dimensional object. In another embodiment, the three-dimensional model may be viewed as a wire-frame model, as a transparent model, as a translucent model, etc. In this way, the user may adjust the model to better match the object that is extruded. In another embodiment, the user may specify an amount of extrusion to be performed.

Also, in one embodiment, extruding the three-dimensional model through the scene may include matching the three-dimensional model to the two-dimensional object in the scene. For example, the user may tag the two-dimensional object with one or more identifiers of the object, and the tag may be used to perform further detection of sub-objects within the two-dimensional object. For instance, if the two-dimensional object is tagged as a person by the user, sub-objects such as a face, hands, eyes, nose, and mouth may be detected within the two-dimensional object.

In addition, in one embodiment, the detected sub-objects of the two-dimensional object may be used to curve fit an outline of the three-dimensional model and the sub-objects within the two-dimensional object such that the detail of such sub-objects match those shown in the two-dimensional object. In another embodiment, one or more transformations such as scaling, translation, and rotation may be performed on the three-dimensional model to adjust the model during the extruding. This may be done either manually or automatically based on image processing.

Furthermore, in one embodiment, extruding the three-dimensional model through the scene may include pushing the three-dimensional model up from behind the photo once the three-dimensional model has been matched to the two-dimensional object in the scene. In this way, the three-dimensional model may give depth to the two-dimensional object and may use textures and details for the two-dimensional object within the two-dimensional scene.

Further still, in one embodiment, the three-dimensional model that is extruded through the two-dimensional scene may be saved as a stereoscopic image or a three-dimensional object. In another embodiment, the three-dimensional object may be used to perform image recognition. For example, the three-dimensional object may be used during the process of analyzing a scene, where it may be determined whether the three-dimensional object matches one or more three-dimensional objects within the scene. In yet another embodiment, the three-dimensional object may be animated. For example, a three-dimensional object depicting a person's head may be animated such that the head turns, eyes of the head blink, a mouth of the head moves, etc.

Also, in one embodiment, a plurality of two-dimensional objects from a plurality of two-dimensional scenes may be utilized to create a three-dimensional object. For example, a matching pair of two-dimensional objects may be identified from within a pair of two-dimensional stereoscopic images (e.g., left and right eye views, etc.), and such two-dimensional objects may be texture mapped onto a three-dimensional model. Additionally, textures associated with the object from the left-view stereoscopic image may be added to the left side of the three-dimensional model, and textures associated with the object from the right-view stereoscopic image may be added to the right side of the three-dimensional model during extrusion. In this way, an object within a stereoscopic scene may be converted into a true three-dimensional object using extrusion.

In this way, an accurate three-dimensional depth may be obtained for three-dimensional objects. Additionally, by producing three-dimensional models based on identified two-dimensional objects, a three-dimensional conversion process may be accelerated. Further, a comprehensive, detailed three-dimensional model database may be constructed, and two-dimensional objects may be easily and automatically detected and extruded with great accuracy and detail.

Figure 3:
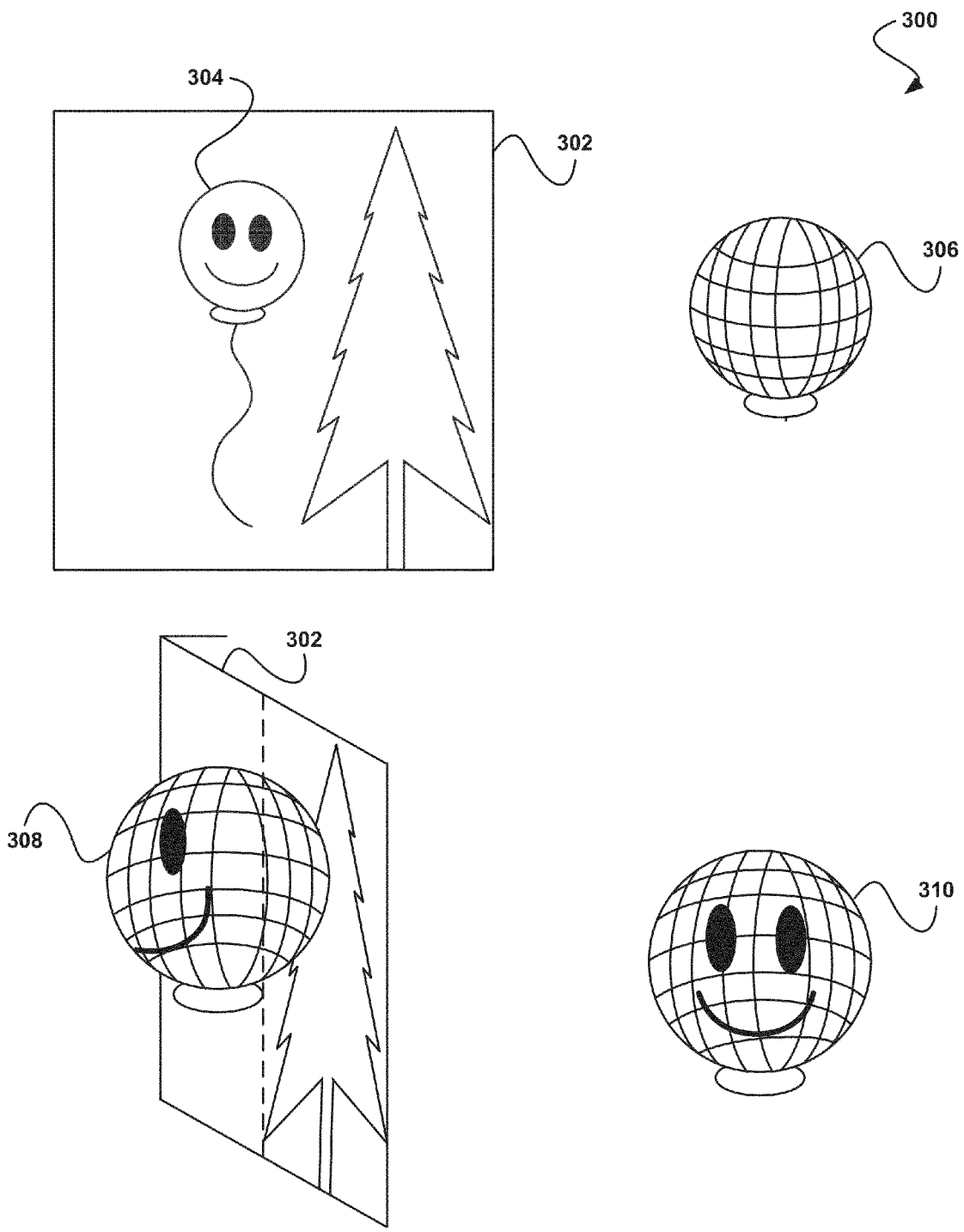
FIG. 3 shows an extrusion process, in accordance with another embodiment.

FIG. 3 shows an extrusion process 300, in accordance with another embodiment. As an option, the exemplary extrusion process 300 may be carried out in the context of the functionality of FIGS. 1-2. Of course, however, the exemplary extrusion process 300 may be implemented in any desired environment. It should also be noted that the aforementioned definitions may apply during the present description.

As shown, a two-dimensional object 304 is identified within a two-dimensional image 302. Additionally, a three-dimensional model 306 that matches the two-dimensional object 304 is retrieved from a database. Further, the three-dimensional model 306 is sized and aligned (either manually or automatically) with the two-dimensional object 304 within the two-dimensional image 302. Further still, the three-dimensional model 306 is pushed through the two-dimensional image 302, where the features within the two-dimensional image 302 are warped to match the shape of the modified three-dimensional model 308 and are used to texture the modified three-dimensional model 308. This results in an extrusion of the two-dimensional object 304 to create a three-dimensional object 310 that includes all of the features from the two-dimensional object 304.

Figure 4:
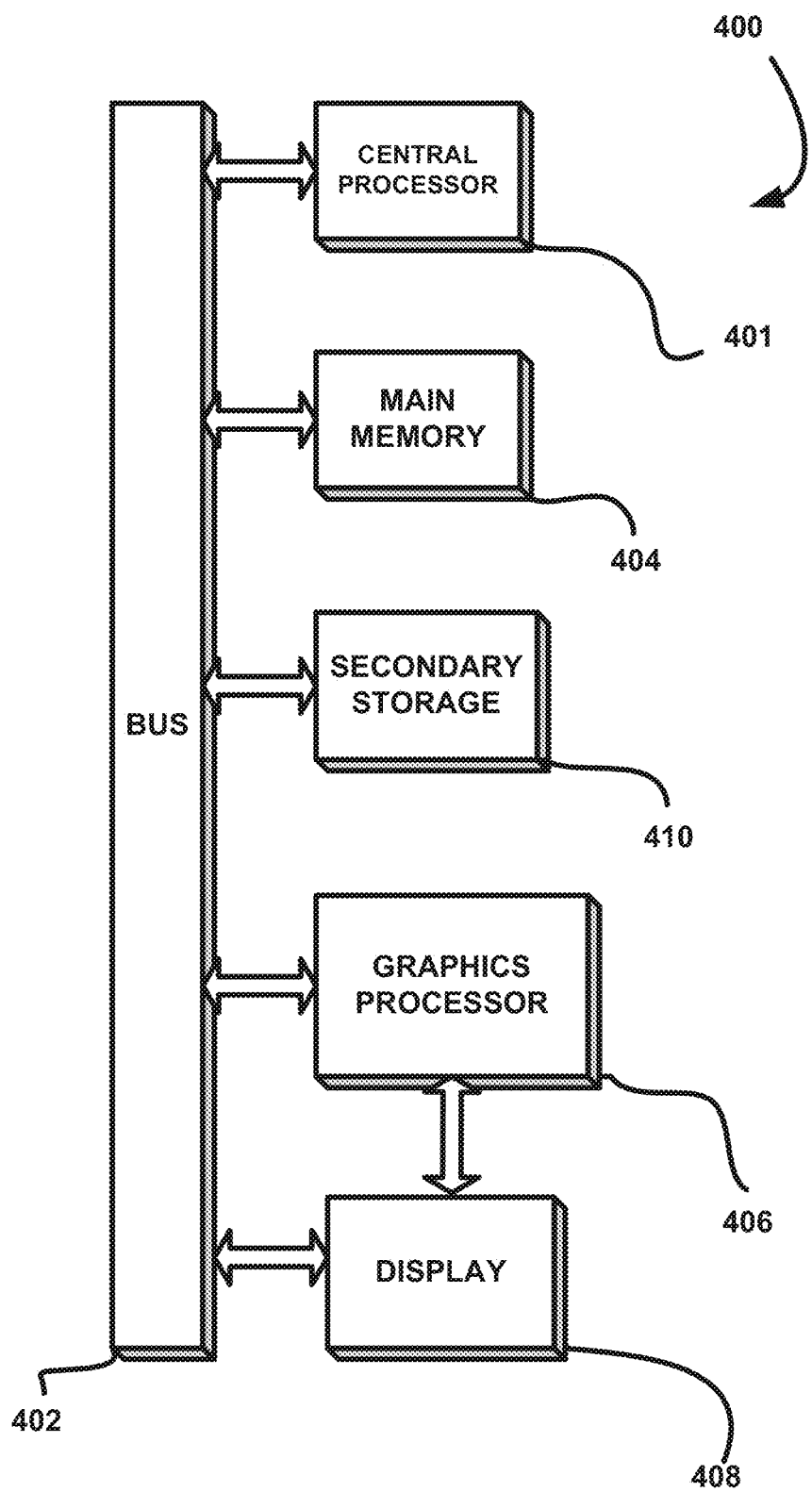
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes. In one embodiment the UI may be performed on a mobile device such as a hand held phone or tablet while the computations are happening on a more powerful computer residing in the cloud.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying, via a processor, a two-dimensional object within a two-dimensional scene, wherein the two-dimensional scene includes a digital image;
    assigning, via the processor, one or more identifiers to the two-dimensional object;
    determining, via the processor, a three-dimensional model that corresponds to the two-dimensional object based on the one or more identifiers by comparing the one or more identifiers to descriptors associated with a plurality of three-dimensional models included in a database;
    aligning, via the processor, the two-dimensional object with the three-dimensional model; and
    mapping, via the processor, the two-dimensional object onto the three-dimensional model to create a texture map for a surface of the three-dimensional model, wherein the mapping includes warping the two-dimensional scene to cover the three-dimensional model.

2. The method of claim 1, wherein the two-dimensional object is automatically analyzed to determine a type of the two-dimensional object.

3. The method of claim 1, wherein mapping the two-dimensional object to the three-dimensional model includes moving the three-dimensional model in a third dimension through the two-dimensional scene.

4. The method of claim 1, wherein the two-dimensional object is aligned with the three-dimensional model manually by manipulating the three-dimensional model using a graphical user interface (GUI).

5. The method of claim 1, wherein one or more sub-objects of the two-dimensional object are identified, and an orientation of each sub-object within the two-dimensional object is determined.

6. The method of claim 5, wherein an orientation of the two-dimensional object within the two-dimensional scene is determined based on the shape of an edge of the two-dimensional object and the orientation of each of the sub-objects within the two-dimensional object.

7. The method of claim 1, further comprising converting the two-dimensional object to a stereoscopic object.

8. The method of claim 1, wherein aligning the two-dimensional object with the three-dimensional model comprises:
   automatically aligning the two-dimensional object with the three-dimensional model; and
   refining the automatic alignment based on one or more characteristics associated with the three-dimensional model.

9. The method of claim 8, wherein the one or more characteristics include at least one of shape, capabilities, movement limitations, positions, and function.

10. The method of claim 1, further comprising performing image recognition based on the three-dimensional model and the texture map.

11. The method of claim 1, further comprising:
    identifying a second two-dimensional object from a second two-dimensional scene, wherein the second two-dimensional object corresponds to the two-dimensional object from the two-dimensional scene, and wherein the two-dimensional scene and the second two-dimensional scene comprise a pair of stereoscopic images.

12. A computer program product embodied on a non-transitory computer readable medium, comprising:
    code for identifying a two-dimensional object within a two-dimensional scene, wherein the two-dimensional scene includes a digital image;
    code for assigning one or more identifiers to the two-dimensional object;
    code for determining a three-dimensional model that corresponds to the two-dimensional object based on the one or more identifiers by comparing the one or more identifiers to descriptors associated with a plurality of three-dimensional models included in a database;
    code for aligning the two-dimensional object with the three-dimensional model; and
    code for mapping the two-dimensional object onto the three-dimensional model to create a texture map for a surface of the three-dimensional model, wherein the mapping includes warping the two-dimensional scene to cover the three-dimensional model.

13. The computer program product of claim 12, wherein aligning the two-dimensional object with the three-dimensional model comprises:
    automatically aligning the two-dimensional object with the three-dimensional model; and
    refining the automatic alignment based on one or more characteristics associated with the three-dimensional model.

14. The computer program product of claim 13, wherein the one or more characteristics include at least one of shape, capabilities, movement limitations, positions, and function.

15. A system, comprising:
    a memory including a plurality of three-dimensional models; and
    a processor coupled to the memory, the processor configured to:
        identify a two-dimensional object within a two-dimensional scene, wherein the two-dimensional scene includes a digital image,
        assign one or more identifiers to the two-dimensional object,
        determine a three-dimensional model that corresponds to the two-dimensional object based on the one or more identifiers by comparing the one or more identifiers to descriptors associated with a plurality of three-dimensional models included in a database,
        align the two-dimensional object with the three-dimensional model, and
        map the two-dimensional object onto the three-dimensional model to create a texture map for a surface of the three-dimensional model, wherein the mapping includes warping the two-dimensional scene to cover the three-dimensional model.

16. The system of claim 15, wherein the processor is coupled to the memory via a bus.

17. The system of claim 15, wherein aligning the two-dimensional object with the three-dimensional model comprises:
    automatically aligning the two-dimensional object with the three-dimensional model; and
    refining the automatic alignment based on one or more characteristics associated with the three-dimensional model.

18. The system of claim 17, wherein the one or more characteristics include at least one of shape, capabilities, movement limitations, positions, and function.

* * * * *